(12) United States Patent
Steynberg et al.

(10) Patent No.: US 7,439,274 B2  
(45) Date of Patent: Oct. 21, 2008

(54) PROCESS FOR PRODUCING LIQUID, AND, OPTIONALLY, GASEOUS PRODUCTS FROM GASEOUS REACTANTS

(75) Inventors: André Peter Steynberg, Vanderbijlpark (ZA); Berthold Berend Breman, Ag Zutphen (NL)

(73) Assignee: SASOL Technology (Proprietary) Limited, Johannesburg (ZA)

(*) Notice: Subject to any disclaimer, the term of this patent is extended or adjusted under 35 U.S.C. 154(b) by 0 days.

(21) Appl. No.: 10/555,957

(22) PCT Filed: May 12, 2004

(86) PCT No.: PCT/IB2004/050656

§ 371 (c)(1), (2), (4) Date: Jul. 27, 2006

(87) PCT Pub. No.: WO2004/101475

PCT Pub. Date: Nov. 25, 2004

(65) Prior Publication Data

US 2007/0043125 A1 Feb. 22, 2007

(51) Int. Cl.  
*C07C 27/00* (2006.01)

(52) U.S. Cl. ...................... 518/705; 518/700
(58) Field of Classification Search ................ 518/700, 518/705
See application file for complete search history.

(56) References Cited

U.S. PATENT DOCUMENTS

| | | | |
|---|---|---|---|
| 2,463,912 A | 3/1949 | Scharmann | |
| 2,481,089 A | 9/1949 | Dickinson | |
| 2,560,171 A | 7/1951 | Hill | |
| 6,160,026 A * | 12/2000 | Dai, et al. | ........ 518/712 |
| 6,203,031 B1 | 3/2001 | Silverman, et al. | |
| 6,800,664 B1 * | 10/2004 | Espinoza et al. | ........ 518/706 |

* cited by examiner

Primary Examiner—Jafar Parsa  
(74) Attorney, Agent, or Firm—Sughrue Mion, PLLC

(57) ABSTRACT

A process (10) for producing liquid and, optionally, gaseous products from gaseous reactants includes feeding at a low level gaseous reactants (14) and, optionally, a portion of a recycle gas stream into a vertically extending slurry bed (70) of solid particles suspended in a suspension liquid inside a vessel (12), and feeding, as an additional gas feed (58), at least a portion of the recycle gas stream into the slurry bed (70) above the level at which the gaseous reactants (814) are fed into the slurry bed (70) and above the lower 20% of the vertical height of the slurry bed (70).

9 Claims, 4 Drawing Sheets

PROCESS FOR PRODUCING LIQUID, AND, OPTIONALLY, GASEOUS PRODUCTS FROM GASEOUS REACTANTS

This invention relates to a process for producing liquid and, optionally, gaseous products from gaseous reactants. It relates also to an installation for producing liquid and, optionally, gaseous products from gaseous reactants.

According to one aspect of the invention, there is provided a process for producing liquid and, optionally, gaseous products from gaseous reactants, which process includes feeding at a low level gaseous reactants and, optionally, a portion of a recycle gas stream into a vertically extending slurry bed of solid particles suspended in a suspension liquid inside a vessel;

feeding, as an additional gas feed, at least a portion of the recycle gas stream into the slurry bed above the level at which the gaseous reactants are fed into the slurry bed and above the lower 20% of the vertical height of the slurry bed;

allowing the gaseous reactants and recycled gas to react as they pass upwardly through the slurry bed, thereby to form liquid and, optionally, gaseous products, and with the liquid product forming together with the suspension liquid, a liquid phase of the slurry bed;

allowing any gaseous product and unreacted gaseous reactants and unreacted recycled gas to disengage from the slurry bed into a head space above the slurry bed;

withdrawing any gaseous product and unreacted gaseous reactants and unreacted recycled gas from the head space;

withdrawing liquid phase from the slurry bed, to maintain the slurry bed at a desired level; and recycling at least some of the gaseous components from the head space to provide the recycle gas stream.

The process preferably includes allowing slurry to pass downwardly from a high level in the slurry bed to a lower level thereof, using slurry redistribution means or slurry redistributors, thereby to redistribute solid particles within the slurry bed.

Typically, the additional gas feed has very little impact on the vertical distribution of the solid particles in the slurry bed. When the vertical distribution of solid particles in the slurry bed of the present invention is compared to that of an identical process but in which all of the gaseous reactants and recycle gas are fed at a single or common low level into the slurry bed, it is found to be substantially the same.

The additional gas feed may be fed at a level which is located between about 20% and about 80% of the vertical height of the slurry bed. Preferably, the additional gas feed is fed at a level which is located above 25%, more preferably above 30% of the vertical height of the slurry bed.

While it is believed that the process can, at least in principle, have broader application, it is envisaged that the solid particles will normally be catalyst particles for catalyzing the reaction of the gaseous reactants into the liquid product, and, when applicable, the gaseous product; and the suspension liquid will normally, but not necessarily always, be the liquid product.

Furthermore, while it is also believed that, in principle, the process can have broader application, it is envisaged that it will have particular application in hydrocarbon synthesis where the gaseous reactants are capable of reacting catalytically in the slurry bed to form liquid hydrocarbon product and, optionally, gaseous hydrocarbon product. In particular, the hydrocarbon synthesis may be Fischer-Tropsch synthesis, with the gaseous reactants being in the form of a synthesis gas stream comprising mainly carbon monoxide and hydrogen, and with both liquid and gaseous hydrocarbon products being produced.

The process may include cooling the gas from the head space to condense liquid product, e.g. liquid hydrocarbons and reaction water, separating the liquid product from the gases to provide a tail gas, and recycling at least some of the tail gas to the slurry bed as the recycle gas stream.

The slurry bed may thus be contained or provided in a reaction zone of a vessel in the form of a slurry reactor or bubble column. The slurry reactor or bubble column thus uses a three-phase system, i.e. solid catalyst particles, liquid product, and gaseous reactants (including any recycled gas) and, optionally, gaseous product and inert gases.

The additional gas feed may be introduced into the slurry bed by means of a gas sparger.

The additional gas feed may make up at least 10% of the total volumetric feed rate of gas entering the slurry bed. Typically, the additional gas feed does not make up more than 60% of the total volumetric feed rate of gas entering the slurry bed.

The catalyst of the catalyst particles can be any desired Fischer-Tropsch catalyst, such as an iron-based catalyst, a cobalt-based catalyst, or any other Fischer-Tropsch catalyst. The catalyst particles may have a desired particle size range, e.g. no catalyst particles greater than 300 microns and less than 5% by mass of the catalyst particles being smaller than 22 microns.

The slurry reactor or bubble column may thus be maintained at normal elevated pressure and temperature conditions associated with Fischer-Tropsch synthesis reactions, e.g. a predetermined operating pressure in the range 10 to 50 bar, and a predetermined temperature in the range 160° C. to 280° C., or even higher for the production of lower boiling point product.

The catalyst particles in the slurry bed are thus maintained in suspension by the turbulence created by the synthesis gas stream (fresh and recycled) passing through the slurry bed, i.e. bubbling through the slurry bed. The gas velocity through the slurry bed is thus sufficiently high to maintain the slurry bed in a state of turbulence or suspension.

In one embodiment of the invention, the entire recycle gas stream being returned to the slurry bed forms part of the additional gas feed.

The process may be characterised in that gas hold-up in the slurry bed is lower in a lower portion of the slurry bed than gas hold-up in a lower portion of a slurry bed of an identical process but in which all of the gaseous reactants and recycle gas are fed at a single low level into the slurry bed. Gas hold-up may be higher in an upper portion of the slurry bed than in an upper portion of the slurry bed of said identical process. However, overall gas hold-up in the slurry bed of the process of the invention will be lower than in the slurry bed of the conventional process.

According to another aspect of the invention, there is provided an installation for producing liquid and, optionally, gaseous products from gaseous reactants, the installation comprising a reactor vessel having a vertically extending slurry bed zone which, in use, will contain a slurry bed of solid particles suspended in a suspension liquid;

a first gas inlet in the vessel at a low level within the slurry bed zone, for introducing gaseous reactants into the vessel;

a second gas inlet in the vessel at a level within the slurry bed zone which is above the first gas inlet, for introducing recycled gas into the vessel, with the second gas inlet in the vessel being above the lower 20% of the vertical height of the slurry bed zone;

a gas outlet in the vessel above the slurry bed zone, for withdrawing gas from a head space above the slurry bed zone; and a liquid outlet in the vessel within the slurry bed zone, for withdrawing liquid product from the vessel.

Preferably, the installation includes slurry redistribution means on one or more slurry redistributors through which, in use, slurry can be redistributed from a high level in the slurry bed to a lower level thereof, thereby to redistribute solid particles in the slurry bed.

The second gas inlet may be at a level which is located between about 20% and about 80% of the vertical height of the slurry bed zone. Preferably, the second gas inlet is at a level above the lower 25%, more preferably above the lower 30% of the vertical height of the slurry bed zone.

The second gas inlet may include a gas sparger.

In this specification, the term 'slurry redistribution means' is intended to refer to physical apparatus used to redistribute slurry and catalyst particles vertically inside the reactor vessel, and does not refer to the slurry and catalyst particle redistribution action of the gas passing upwards through the slurry bed. The slurry redistribution means or slurry redistributors may thus include downcomers or draught tubes or mechanical redistribution apparatus such as pipes and pumps and filters.

When the slurry redistribution means includes downcomers, the downcomers may be arranged in a first downcomer region and a second downcomer region, with the second downcomer region being vertically spaced with respect to the first downcomer region.

The downcomers or draught tubes may thus be located at different levels or vertical elevations within the slurry bed or the slurry bed zone. The second downcomer region may be located at a higher level than the first downcomer region, and, if desired, further downcomer regions, each containing at least one downcomer or draught tube may be provided above the second downcomer region, with a third and any subsequent downcomer regions also being spaced vertically from one another.

In one embodiment of the invention, the second downcomer region may overlap the first downcomer region. In other words, the lower end(s) of the downcomer(s) in the second downcomer region may overlap the upper end(s) of the downcomer(s) in the first downcomer region. In another embodiment of the invention, however, the second downcomer region may be located in non-overlapping relationship with respect to the first downcomer region. In other words, the lower end(s) of the downcomer(s) in the second downcomer region may be spaced with vertical clearance from the upper end(s) of the downcomer(s) in the first downcomer region.

The downcomer(s) in the second downcomer region may be staggered with respect to that (those) in the first downcomer region, when the reactor or vessel is seen in plan view. In other words, the lower end(s) of the downcomer(s) in the second downcomer region preferably does(do) not discharge slurry directly above the upper end(s) of the downcomer(s) in the first downcomer region.

Each downcomer may comprise a lower transport section and an upper disengagement or degassing section of greater cross-sectional area than the transport section. The sections are preferably circular in cross-section, is of cylindrical form, with an outwardly upwardly flaring connecting component connecting the disengagement section to the transport section. However, the disengagement section can, if desired, be in another suitable form, e.g. in the form of a rectangular or triangular section channel, as determined by the space available inside the reactor vessel.

While each downcomer will normally be located entirely within the slurry bed i.e. inside the reactor, with the degassing section typically aligned axially with the transport section, the transport section and, optionally, part of the degassing section can, instead, be located outside the reactor, with the lower outlet end of the transport section and at least the upper inlet end of the degassing section then, however, being located inside the reactor in the slurry bed or the slurry bed zone.

The process may include operating the slurry reactor such that the slurry bed is in a heterogeneous or churn-turbulent flow regime and comprises a dilute phase consisting of fast-rising large bubbles of gaseous reactants, and, possibly gaseous product, which traverse the reaction zone or slurry bed virtually in a plug flow manner, and a dense phase comprising liquid phase, i.e. liquid product, solid catalyst particles, and entrained smaller bubbles of gaseous reactants and, possibly, gaseous product.

The invention will now be described in more detail with reference to the following Examples and the accompanying drawings, in which

Figure 1:
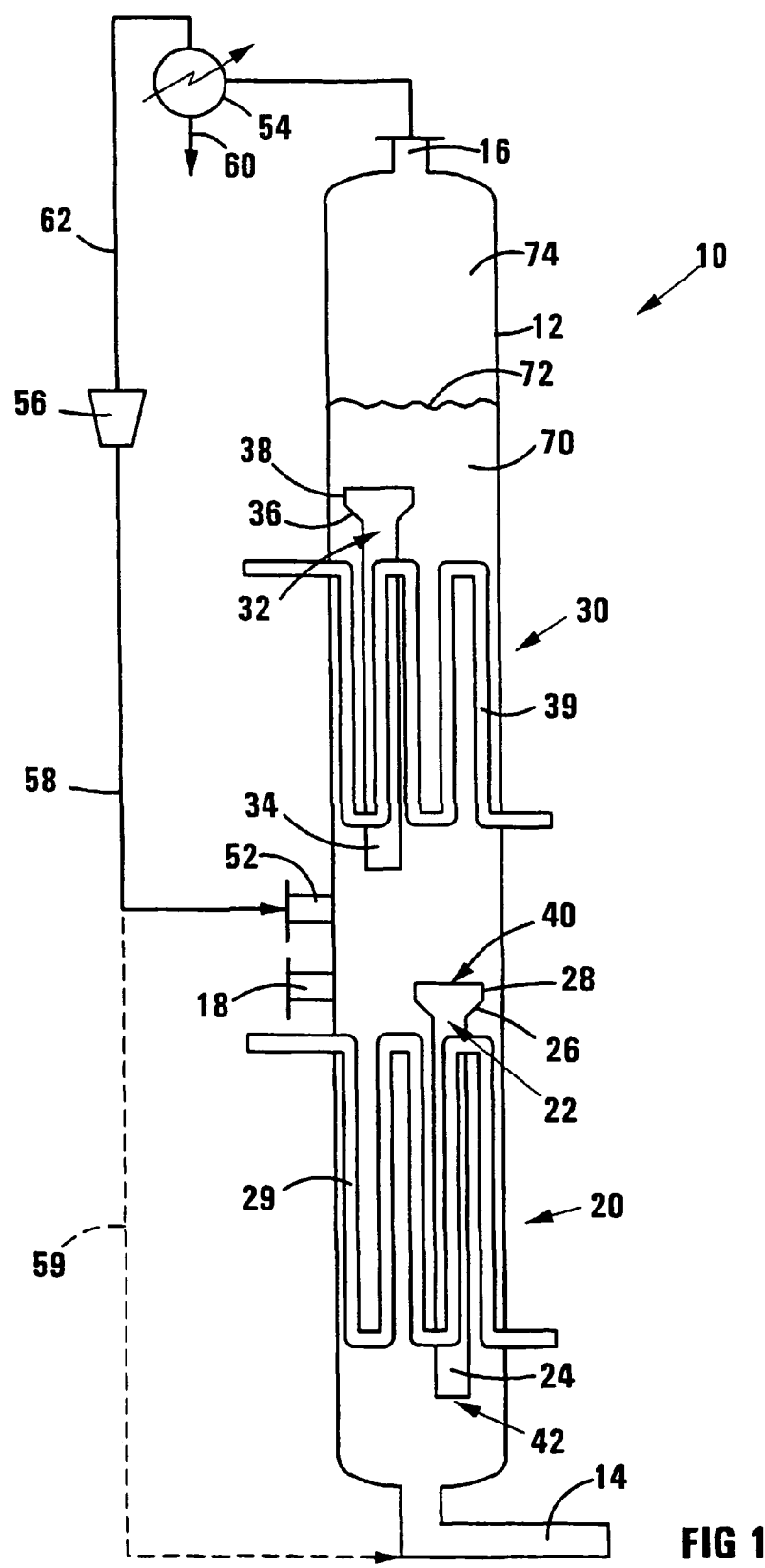
FIG. 1 shows schematically a longitudinal sectional view of an installation in accordance with the invention for producing liquid and gaseous products from gaseous reactants.

In the drawings, reference numeral 10 generally indicates an installation according to the invention for producing liquid and gaseous products from gaseous reactants.

The installation 10 includes an upright cylindrical slurry reactor or bubble column 12, with a bottom gas inlet 14 leading into a gas distributor (not shown) inside the reactor 12 and a gas outlet 16 leading from the top of the reactor 12. A liquid product outlet 18 leads from the reactor 12 at any convenient level.

The reactor 12 includes a first downcomer region, generally indicated by reference numeral 20. The downcomer region 20 includes a downcomer, generally indicated by reference numeral 22. The downcomer 22 includes a cylindrical transport section 24 of relatively small diameter, an outwardly flaring connecting component 26 at an upper end of the transport section 24, and a larger diameter degassing section 28, a lower end of which is connected to the connecting component 26. An upper end of the degassing section 28 thus provides an inlet 40 for slurry, while a lower end of the transport section 24 provides a slurry outlet 42. A cooling coil 29 is also provided in the downcomer region 20.

The reactor 12 also includes a second downcomer region, generally indicated by reference numeral 30. The downcomer region 30 includes a downcomer, generally indicated by reference numeral 32. The downcomer 32 also includes a transport section 34 of relatively small diameter, an outwardly flaring connecting component 36 at an upper end of the transport section 34, and a degassing section 38 of relatively large diameter at an upper end of the transport section 34. A lower end of the degassing section 38 is thus connected to the connecting component 36. An upper end of the degassing section 38 provides a slurry inlet, while a lower end of the transport section 34 provides a slurry outlet. A cooling coil 39 is also provided in the downcomer region 30.

The lower end of the downcomer 32 is spaced with vertical clearance from the upper end of the downcomer 22. Furthermore, the downcomer 32 is not aligned axially with the downcomer 22. In other words, the downcomer 32 is staggered relative to the downcomer 22 when the reactor 12 is seen in plan view.

The gas inlet 14 is a first gas inlet. A second gas inlet 52 is provided at a level or an elevation above the first gas inlet 14. The second gas inlet 52 also leads into a gas distributor which is not shown inside the reactor 12.

The installation 10 further includes a separation unit 54 in flow communication with the gas outlet 16 and a compressor 56 in flow communication with the separation unit 54. A recycle gas stream line 58 leads from the compressor 56 to the second gas inlet 52. A liquid product line 60 leads from the separation unit 54, with a tail gas line 62 establishing flow communication between the separation unit 54 and the compressor 56.

In use, fresh synthesis gas comprising mainly carbon monoxide and hydrogen as gaseous reactants, is fed into the bottom of the reactor 12 through the first gas inlet 14, the gas typically being uniformly distributed through a sparger system (not shown) inside the reactor 12. Simultaneously, a recycle gas stream (typically cooled) comprising typically hydrogen, carbon monoxide, methane and carbon dioxide is fed through the second gas inlet 52 into the reactor 12 at a level above the first gas inlet 14 through a sparger system (not shown) inside the reactor 12. Typically, the second gas inlet 52 is located at least about 20% of the vertical height of the reactor 12 above the first gas inlet 14.

The gaseous reactants, comprising the fresh synthesis gas and the recycled gas, pass upwardly through a slurry bed 70 comprising Fischer-Tropsch catalyst particles, typically an iron or cobalt based catalyst, suspended in liquid product. The slurry bed is operated to have a normal level 72 above the second downcomer region 30, with a head space 74 being provided above the slurry bed 70. As the synthesis gas bubbles through the slurry bed 70, the gaseous reactants therein react catalytically to form liquid product, which thus forms part of the slurry bed 70. From time to time, or continuously, liquid phase comprising liquid product is withdrawn through the outlet 18, with catalyst particles being separated from the liquid product in a suitable internal or external separation system, e.g. using filters (not shown). if the separation system is located externally to the reactor, an additional system (not shown) to return the separated catalyst particles to the reactor is then provided.

The fresh synthesis feed gas and the recycled gas is introduced into the reactor 12 at a rate sufficient to agitate and suspend all of the catalyst particles in the system without settling. The gas flow rates will be selected depending on the slurry concentration, catalyst density, suspending medium density and viscosity, and particular particle size used. Suitable gas flow rates include, for example, from about 5 cm/s to about 50 cm/s.

However, gas velocities up to about 85 cm/s have been tested in bubble columns. The use of higher gas velocities has the disadvantage that it is accompanied by a higher gas hold-up in the reactor leaving relatively less space to accommodate the catalyst-containing slurry. Whatever gas flow rate is however selected, it should be sufficient to avoid particle settling and agglomeration.

Some slurry continuously passes downwardly through the downcomers 32, 22 thereby to achieve uniform redistribution of catalyst particles within the slurry bed 70, and also to ensure uniform heat redistribution throughout the slurry bed.

The reactor 12 is operated so that the slurry bed 70 thereof is in a heterogeneous or churn-turbulent flow regime and comprises a dilute phase consisting of fast-rising larger bubbles of gaseous reactants and gaseous product which traverse the slurry bed virtually in plug flow fashion and a dense phase which comprises liquid product, solid catalyst particles and entrained smaller bubbles of gaseous reactants and gaseous product.

Boiler water as a heat exchange or transfer medium, is circulated through the coolant coils 29, 39. Heat is transferred from the slurry bed 70 to the boiler water to form a mixture of steam and water.

Light hydrocarbon products, such as a $C_{20}$ and below fraction is withdrawn from the reactor through the gas outlet 16 and passed to the separation unit 54. Typically, the separation unit 54 comprises a series of coolers and a vapour-liquid separator and may optionally include further coolers and separators and possibly also a cryogenic unit for removal of hydrogen, carbon monoxide, methane and carbon dioxide from the $C_{20}$ and below hydrocarbon fraction. Other separation technologies such as membrane units, pressure swing adsorption units and/or units for the selective removal of carbon dioxide may be employed. The separated gases comprising hydrogen, carbon monoxide and other gases are compressed and recycled by means of the compressor 56 to provide the recycle gas stream. Condensed liquid hydrocarbons and reaction water is withdrawn from the separation unit 54 by means of the flow line 60 for further working up.

It is to be appreciated that, although the installation 10, as illustrated, indicates that all of the recycle gas stream is returned to the reactor 12, it is not necessarily so that the entire recycle gas stream has to be returned to the reactor 12. It is thus possible that only a portion of the recycle gas stream is returned to the reactor 12. It is also possible that a portion of the recycle gas stream is combined with the fresh synthesis gas to be fed into the reactor 12 through the first gas inlet 14. Typically, between about 10% and about 60% of the total volumetric feed rate of gas entering the slurry bed 70 is fed through the second gas inlet 52, with the volumetric ratio of recycled gas to fresh synthesis gas typically being between 0.1 and 1.5.

The Applicant has surprisingly found that higher reactor capacities can be achieved if at least a portion of the recycled gas is introduced at a higher level into the reactor vessel 12 than the synthesis gas which is fed at the lower end of the reactor 12. As will be appreciated, this leads to cost savings for the construction of the reactor or, instead, to an increase in capacity for reactors modified to have a second, higher gas inlet. Although not wishing to be bound by theory, the Applicant believes that a possible explanation for the resulting higher reactor capacity is a lower gas hold-up when employing the invention. It is known that the volume of gases and vapours decreases as the Fischer-Tropsch reaction proceeds and gaseous reactants are converted to higher molecular weight hydrocarbon products. There is thus a vertical gradient in the volume of gases and vapours in the reactor 12. By feeding at least a portion of the recycled gas at a higher elevation into the reactor 12, there is a section of the reactor 12 below this higher elevation where the gas velocity is now lower and decreasing while the gas density is lower and increasing as the gas moves upward. Gas hold-up increases with gas density. Comparing this situation with the case where all of the gas is introduced at the lower end of the reactor 12, it will be noted that both a lower maximum velocity and a lower average velocity is achieved for the gas, as well as a lower average gas density in the reactor 12. The end result is thus a lower gas hold-up which allows more catalyst-containing slurry to be accommodated in a given reactor volume. Surprisingly, the extra catalyst more than compensates for the fact that some recycled gas bypasses a portion of the catalyst. Accordingly, for the same reactor volume, containing more catalyst, the flow of both fresh synthesis gas and recycled gas may be increased, relative to the case where all the gas is introduced at the lower end of the reactor, while still achieving the same level (or percentage) conversion of reactants in the synthesis gas.

It is a further advantage of the process of the invention, as illustrated, that the introduction of cooled gas above the bottom of the reactor, together with the use of slurry redistribution means can be employed to ensure a more uniform temperature in the slurry bed. This allows the cooling pipes in the slurry bed, which may be located in two or more banks, at different vertical locations, to be connected to a singe steam drum. This avoids the need for multiple steam drums operating at different temperatures and pressures.

The following two examples illustrate some of the advantages set out hereinbefore.

In these examples a conventional or base case Fischer-Tropsch process was mathematically modelled. For the conventional process, the model assumed that the total gas feed (fresh synthesis gas and recycled gas) is fed to the bottom of a slurry bubble column. A process in accordance with the invention was also modelled where the total recycle gas flow rate is fed at a level of 34% of the vertical height of a slurry bed in a slurry bubble column. In both cases, it was assumed that slurry redistribution means was present and was sufficient to ensure a uniform solid catalyst concentration in the slurry bed. For both cases, the solid catalyst concentration in the slurry bed was assumed to be constant. The models used a fresh feed synthesis gas $H_2/CO$ molar ratio of 1.925, a recycle gas to fresh gas feed ratio of 0.9 and a constant targeted overall $H_2$ conversion of approximately 93%. In the models, this conversion was achieved by varying the flow rate of fresh synthesis gas feed to a slurry bed reactor of fixed size and which was the same size for both models. The choice of slightly sub-stoichiometric fresh gas feed was based on the well known effect that a sub-stoichiometric fresh gas feed enhances the selectivity to higher hydrocarbons and suppresses the methane selectivity.

EXAMPLE 1

For Example 1, the models assumed that both a dilute and a slurry or dense phase of the slurry bed is in plug flow.

The results of the mathematical simulations, using the models of Example 1, indicated that the process of the invention has an increased fresh synthesis gas feed rate of approximately 16% compared to the conventional process. It can thus be stated that the slurry bubble column conversion capacity is therefore approximately 16% more for the process of the invention than for the conventional process. The selectivity to $C_5+$ products was almost unchanged, based on the expected catalyst selectivity behaviour for a known commercial catalyst.

The process of the invention showed a total catalyst loading that is more than 5% larger for the same solids concentration in the slurry bed than the conventional case. This is as a result of a lower overall or total gas hold-up, despite the larger gas feed rate. The slurry bubble column productivity of the process of the invention is further aided by increased reagent concentration and $H_2/CO$ ratio in the portion of the slurry bed below the level where the recycled gas is introduced.

Figure 2:
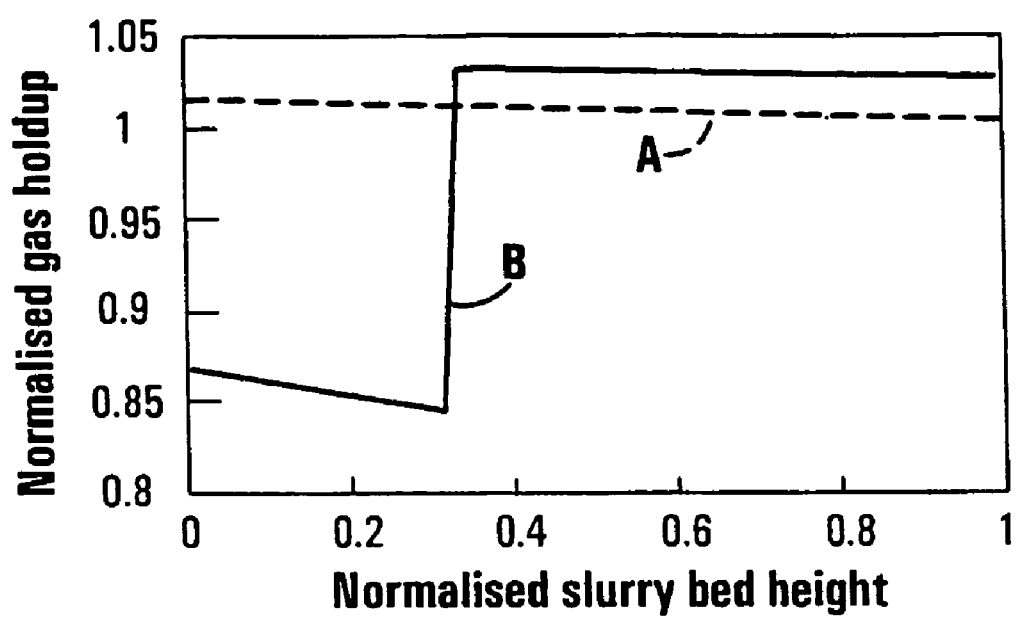
FIG. 2 shows a graph of normalised gas hold-up versus normalised slurry bed height for a conventional Fischer-Tropsch process in which total gas feed is fed to a reactor bottom and for a Fischer-Tropsch process in accordance with the invention, both processes being modelled with the dilute phase and the dense phase in plug flow.
Figure 3:
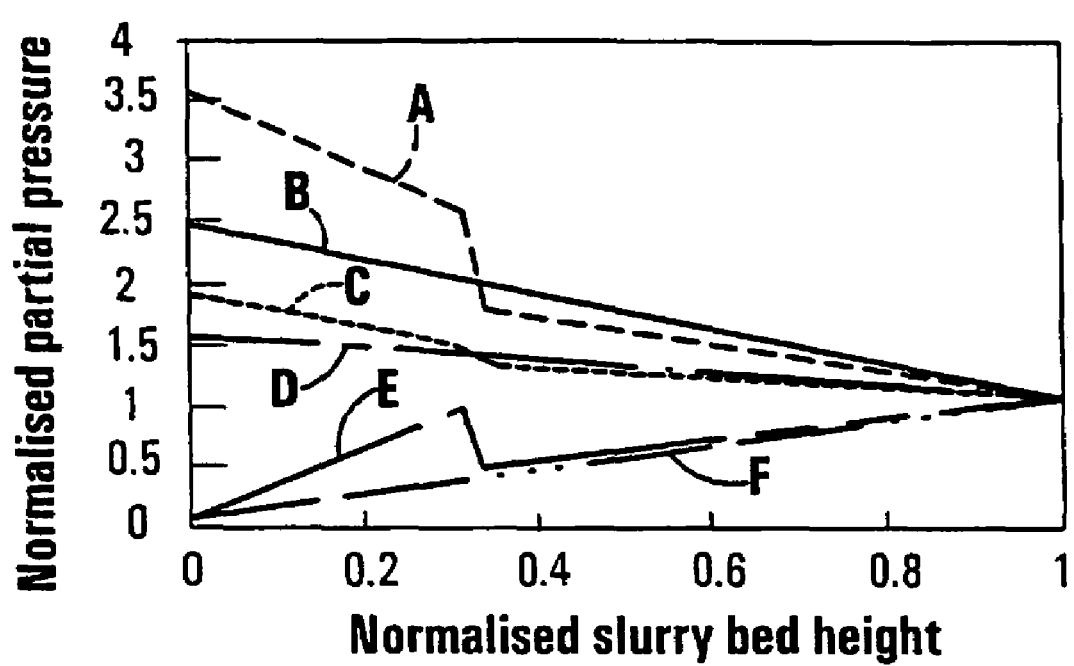
FIG. 3 shows a graph of normalised partial pressure of CO, $H_2$ and $H_2O$ versus normalised slurry bed height for the conventional process and the process of the invention for which the gas hold-up is shown in FIG. 2.

The normalised gas hold-up and normalised partial pressure of selected gaseous components as a function of normalised slurry bed height are illustrated in FIGS. 2 and 3 respectively, for both the conventional process and the process of the invention.

It is to be noted that the level at which recycled gas is fed into the slurry bubble column of the process of the invention was selected so that the water partial pressure at this point matches the outlet water partial pressure. It is believed that high water partial pressure may be detrimental to catalyst performance.

In FIG. 2, graph A shows the gas hold-up for the conventional process and graph B shows the gas hold-up for the process of the invention. In FIG. 3, graph A shows the partial pressure of $H_2$ for the process of the invention and graph B shows the partial pressure of $H_2$ for the conventional process, graph C shows the partial pressure of CO for the process of the invention and graph D shows the partial pressure of CO for the conventional process, and graph E shows the partial pressure of water for the process of the invention and graph F shows the partial pressure of water for the conventional process.

EXAMPLE 2

For Example 2, it was assumed that the dilute phase is in plug flow and the dense phase or slurry phase is well mixed. The results of the mathematical simulation using the models of Example 2 showed that the process of the invention can accommodate an increase in fresh synthesis gas feed of approximately 4% compared to the conventional process. The slurry bubble conversion capacity is therefore approximately 4% more for the process of the invention than for the conventional process. The selectivity for $C_5+$ products remained almost unchanged.

The process of the invention as modelled in Example 2 has a total catalyst loading that is approximately 4% larger for the same solids concentration in the slurry bed, compared to the solids concentration for the conventional process. This is due to the lower overall or total gas hold-up in the slurry bed of the conventional process, despite the larger gas feed rate.

Figure 4:
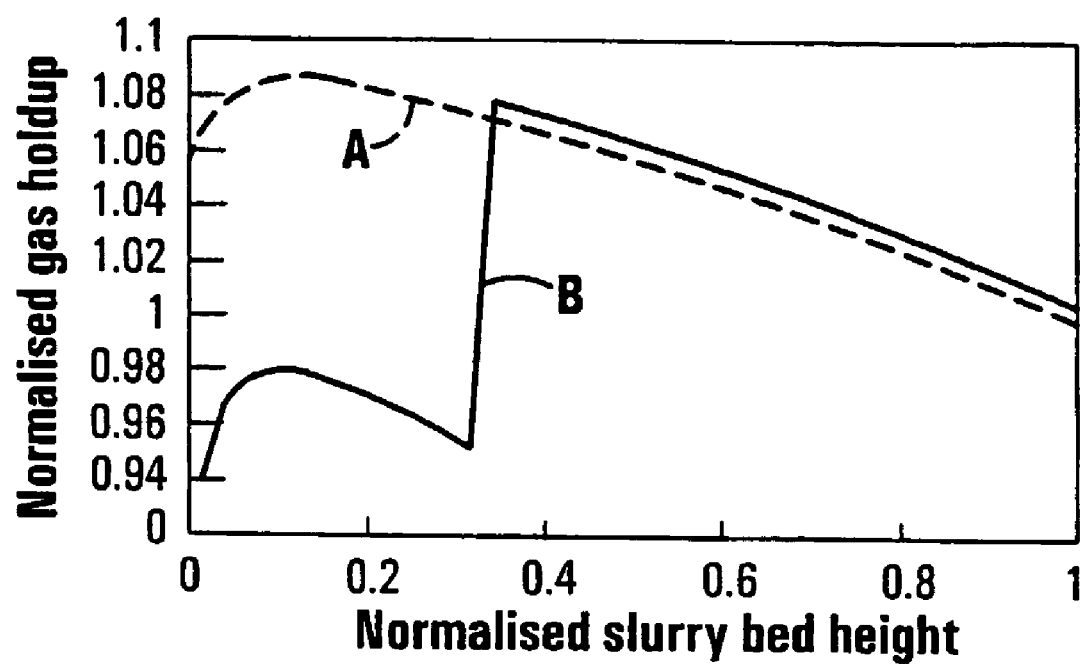
FIG. 4 shows a graph of normalised gas hold-up versus normalised slurry bed height for a conventional Fischer-Tropsch process in which total gas feed is fed to a reactor bottom and for a Fischer-Tropsch process in accordance with the invention, both processes being modelled with a plug flow dilute phase and a well-mixed dense phase.

FIG. 4 shows the normalised gas hold-up as a function of normalised slurry bed height for Example 2. Graph A shows the gas hold-up for the conventional process and graph B shows the gas hold-up for the process of the invention.

The true slurry bubble column behaviour of a conventional process and the process of the invention is expected to lie between the extremes illustrated in Examples 1 and 2 and will be influenced by the choice, capacity and arrangement of slurry redistribution means, if present.

The invention claimed is:
1. A process for producing liquid and, optionally, gaseous products from gaseous reactants, which process includes feeding at a low level gaseous reactants and, optionally, a portion of a recycle gas stream into a vertically extending slurry bed of solid particles suspended in a suspension liquid inside a vessel;

feeding, as an additional gas feed, at least a portion of the recycle gas stream into the slurry bed above the level at which the gaseous reactants are fed into the slurry bed and above the lower 20% of the vertical height of the slurry bed;

allowing the gaseous reactants and recycled gas to react as they pass upwardly through the slurry bed, thereby to form liquid and, optionally, gaseous products, and with the liquid product forming together with the suspension liquid, a liquid phase of the slurry bed;

allowing any gaseous product and unreacted gaseous reactants and unreacted recycled gas to disengage from the slurry bed into a head space above the slurry bed;

withdrawing any gaseous product and unreacted gaseous reactants and unreacted recycled gas from the head space;

withdrawing liquid phase from the slurry bed, to maintain the slurry bed at a desired level; and recycling at least some of the gaseous components from the head space to provide the recycle gas stream.

2. The process as claimed in claim 1, which includes allowing slurry to pass downwardly from a high level in the slurry bed to a lower level thereof, using slurry redistribution means or slurry redistributors, thereby to redistribute solid particles within the slurry bed.

3. The process as claimed in claim 1, in which the additional gas feed is fed at a level which is located between 20% and 80% of the vertical height of the slurry bed.

4. The process as claimed in claim 1, in which the solid particles are catalyst particles for catalyzing the reaction of the gaseous reactants into the liquid product, and, when applicable, the gaseous product; and the suspension liquid is the liquid product.

5. The process as claimed in claim 1, which is a hydrocarbon synthesis process wherein the gaseous reactants are capable of reacting catalytically in the slurry bed to form liquid hydrocarbon product and, optionally, gaseous hydrocarbon product.

6. The process as claimed in claim 1, in which the additional gas feed makes up at least 10% of the total volumetric feed rate of gas entering the slurry bed.

7. The process as claimed in claim 1, in which the additional gas feed does not make up more than 60% of the total volumetric feed rate of gas entering the slurry bed.

8. The process as claimed in claim 1, in which the additional gas feed is fed at a level which is located above 30% of the vertical height of the slurry bed.

9. The process as claimed in claim 1, in which the entire recycle gas stream forms part of the additional gas feed.

* * * * *